(12) United States Patent
Treloar et al.

(10) Patent No.: US 11,573,352 B2
(45) Date of Patent: Feb. 7, 2023

(54) FACILITATING HYDROCARBON EXPLORATION BY APPLYING A MACHINE-LEARNING MODEL TO BASIN DATA

(71) Applicant: Landmark Graphics Corporation, Houston, TX (US)

(72) Inventors: Michael Charles Quintrell Treloar, Didcot (GB); Owen Edward Sutcliffe, Steventon (GB); Daniel James David Slidel, Tilehurst (GB)

(73) Assignee: Landmark Graphics Corporation, Houston, TX (US)

( * ) Notice: Subject to any disclaimer, the term of this patent is extended or adjusted under 35 U.S.C. 154(b) by 278 days.

(21) Appl. No.: 16/864,810

(22) Filed: May 1, 2020

(65) Prior Publication Data
US 2021/0341643 A1 Nov. 4, 2021

(51) Int. Cl.
*G01V 99/00* (2009.01)
*G06N 5/04* (2006.01)
*G06N 20/00* (2019.01)

(52) U.S. Cl.
CPC .............. *G01V 99/005* (2013.01); *G06N 5/04* (2013.01); *G06N 20/00* (2019.01)

(58) Field of Classification Search
CPC .. E21B 2200/20; E21B 2200/22; E21B 43/30; G01V 99/005; G06N 20/00; G06N 5/04
See application file for complete search history.

(56) References Cited

U.S. PATENT DOCUMENTS

| | | |
|---|---|---|
| 2009/0056935 A1 | 3/2009 | Prange et al. |
| 2010/0257004 A1 | 10/2010 | Perlmutter et al. |
| 2011/0172976 A1 | 7/2011 | Budiman et al. |
| | (Continued) | |

FOREIGN PATENT DOCUMENTS

| | | |
|---|---|---|
| CN | 110503224 | 11/2019 |
| WO | 2010082969 | 7/2010 |
| WO | 2019023255 | 1/2019 |

OTHER PUBLICATIONS

Baker et al., "Geologic Field Number and Size Assessment of Oil and Gas Plays", Exxon Production Research Company, pp. 1-7, 1986.

(Continued)

*Primary Examiner* — Roy Y Yi
*Assistant Examiner* — Geoffrey T Evans
(74) *Attorney, Agent, or Firm* — Kilpatrick Townsend & Stockton LLP

(57) ABSTRACT

A system includes a processor and a memory. The memory includes instructions that are executable by the processor to cause the processor to receive basin data of a target basin including an area of the target basin, a number of exploration wells in the target basin, and a number of discovery wells in the target basin. Additionally, the instructions are executable to cause the processor to provide the basin data as input to a trained machine-learning model to determine a predicted trajectory of exploration efficiency of the target basin. Further, the instructions are executable to cause the processor to, in response to providing the basin data as input to the trained machine-learning model, receive an output from the trained machine-learning model indicating the predicted trajectory of exploration efficiency in the target basin.

20 Claims, 7 Drawing Sheets

(56) References Cited

U.S. PATENT DOCUMENTS

2012/0285701 A1 11/2012 Cheng et al.
2019/0302310 A1 10/2019 Fox et al.

OTHER PUBLICATIONS

M.O. Bohorquez, "Hydrocarbon Discovery Potential in Colombian Basins: Creaming Curve Analysis", AAPG EP Regional Conference & Exhibition, pp. 1-19, Jul. 21, 2014.
Meisner et al., "The Creaming Method: A Bayesian Procedure to Forecast Future Oil and Gas Discoveries in Mature Exploration Provinces", J.R. Statist. Soc., pp. 1-31, 1981.
Sorrell et al., Hubbert's Legacy: A Review of Curve-Fitting Methods to Estimate Ultimately Recoverable Resources, Natural Resources Research, vol. 19, No. 3, pp. 209-230, Sep. 3, 2010.
GB Application No. GB2104244.5 , "Combined Search and Examination Report", dated Jan. 17, 2022, 5 pages.
Abbas et al., "Wellbore Trajectory Optimization Using Rate of Penetration and Wellbore Stability Analysis", SPE International Heavy Oil Conference and Exhibition, SPE-193755-MS, 2018, 11 pages.
Application No. PCT/US2020/031066, International Search Report and Written Opinion, dated Jan. 26, 2021.

| Basin | Area | No. of Expl. Wells | No. of Disc. | Disc. Resources | Norm. Factor | Norm. Area | Norm. of Expl. Wells | Norm. No. of Disc. | Norm. Area of Basin per Field |
|---|---|---|---|---|---|---|---|---|---|
| A | 200 | 50 | 10 | 3000 | 0.333 | 66.667 | 16.667 | 3.333 | 20 |
| A | 200 | 42 | 9 | 2800 | 0.357 | 71.429 | 15 | 3.214 | 22.222 |
| A | 200 | 34 | 8 | 2700 | 0.370 | 74.074 | 15.593 | 2.963 | 25 |
| A | 200 | 29 | 7 | 2500 | 0.4 | 80 | 11.6 | 2.8 | 28.571 |
| A | 200 | 21 | 6 | 2100 | 0.476 | 95.238 | 10 | 2.857 | 33.333 |
| A | 200 | 17 | 5 | 1900 | 0.526 | 105.263 | 8.947 | 2.632 | 40 |
| A | 200 | 14 | 4 | 1600 | 0.625 | 125 | 8.75 | 2.5 | 50 |
| A | 200 | 8 | 3 | 1000 | 1 | 200 | 8 | 3 | 66.667 |
| A | 200 | 5 | 2 | 130 | 7.692 | 1538.462 | 38.462 | 15.385 | 100 |
| A | 200 | 3 | 1 | 100 | 10 | 2000 | 30 | 10 | 200 |

FACILITATING HYDROCARBON EXPLORATION BY APPLYING A MACHINE-LEARNING MODEL TO BASIN DATA

TECHNICAL FIELD

The present disclosure relates generally to hydrocarbon exploration. More specifically, but not by way of limitation, this disclosure relates to facilitating hydrocarbon exploration by applying a machine-learning model to basin data.

BACKGROUND

Hydrocarbon exploration is the search for hydrocarbons (e.g., oil or gas) within a subterranean formation. The subterranean formation may be part of a basin that stores hydrocarbons. Maturity of hydrocarbon exploration within the basin may heavily impact the quantity and quality of successful wells drilled in the basin in the future. Well operators can use a variety of techniques to measure basin maturity properties of the basin. These measurements can then be interpreted to predict future exploration success within the basin. Incorrect interpretation of such measurements can result in a poor success rate in future exploration wells and, in some cases, premature withdrawal from future exploration in basins that are still in an infancy of exploration.

BRIEF DESCRIPTION OF THE DRAWINGS

FIGS. 4A and 4B depict an example of a graph representing a table of basin data according to some aspects of the present disclosure.

DETAILED DESCRIPTION

Certain aspects and features of the present disclosure relate to facilitating hydrocarbon exploration by applying a machine-learning model to basin exploration data. Basin exploration data may include an area of a basin, a number of exploration wells in the basin, and a number of discovery wells in the basin. The basin exploration data may be generated using observed historical information about the basin. As one particular example, a machine-learning model can receive input including the basin data that characterizes the exploration of the basin. In response to receiving the basin data, the machine-learning model can generate an output indicating a predicted trajectory of future exploration efficiency in the target basin. An exploration efficiency may represent a measurement of increased difficulty of discovering a discovery well as exploration progresses. In other words, the output of the machine-learning model can be used to determine the trajectory of the exploration difficulty as new resource producing wells are discovered in the basin.

The machine-learning model can be trained using a training dataset. The training dataset can include basin datasets collected from various geographical regions for subterranean formations made of different rock types and geological bodies. Each of the basin datasets can be assigned one or more labels in the training dataset indicating the type or types of geological bodies that are reflected in the basin datasets. A supervised training method can be applied to train the machine-learning model based on the training dataset.

In some examples, a computing device can execute (e.g., automatically execute) one or more processing operations based on the output of the machine-learning model. For example, the computing device can determine that a particular basin is likely to be more favorable for exploration than another basin based on the outputs from the machine-learning model. The computing device can then apply a scoring-analysis algorithm to the input basin data to identify basins with a greatest predicted exploration efficiency. After scoring the basins, the computing device can generate a graphical user interface (GUI) that identifies scored basins relative to one another, such as in a map depiction of a geographical area.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
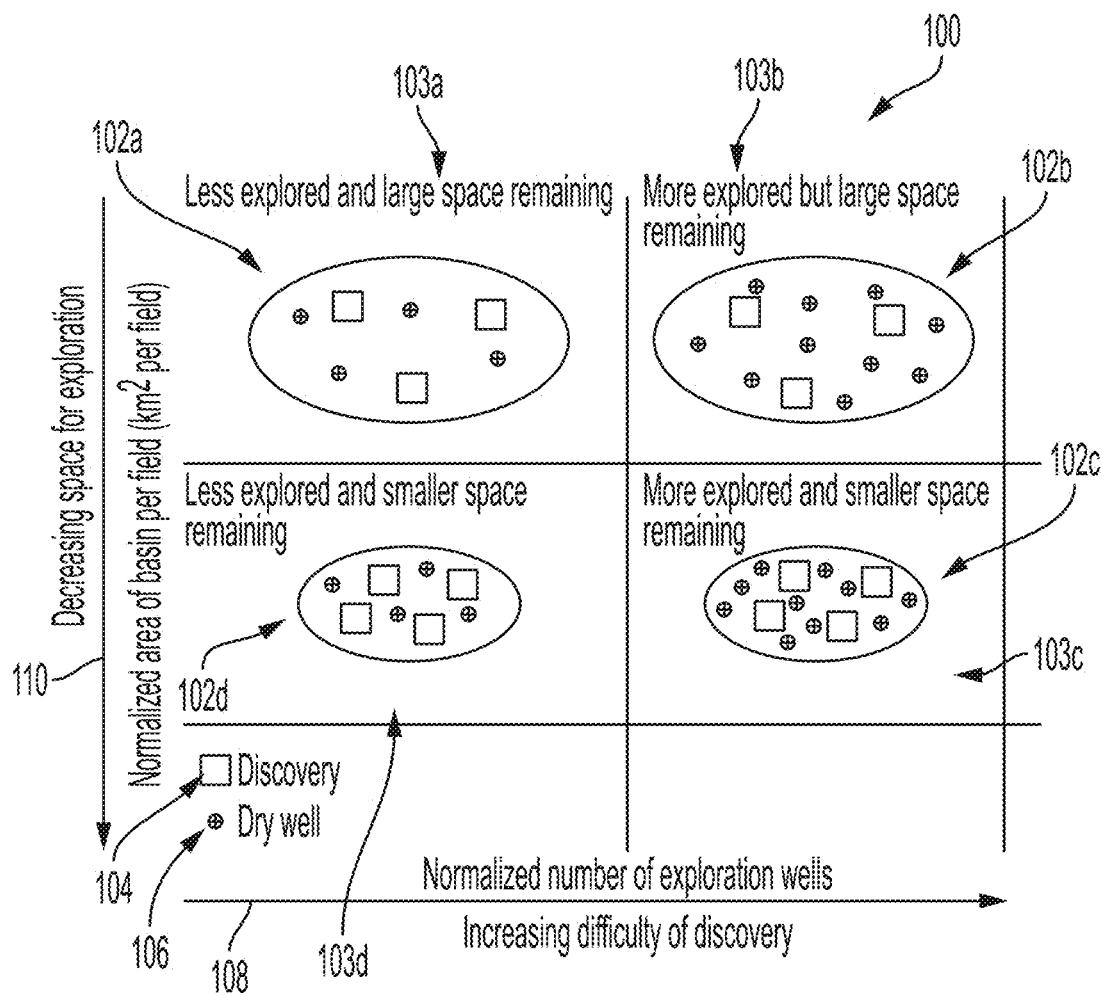
FIG. 1 depicts an exploration efficiency comparison of examples of multiple basin exploration environments according to some aspects of the present disclosure.

FIG. 1 is an exploration efficiency comparison 100 of examples of multiple basin exploration environments 102a, 102b, 102c, and 102d according to some aspects of the present disclosure. The efficiency comparison 100 is arranged in quadrants with the basin exploration environment 102a, which includes the most space remaining for exploration and the least number of exploration wells, located in the top-left quadrant 103a. Further, the efficiency comparison 100 includes the basin exploration environment 102c, which includes the least space remaining for exploration and the most number of exploration wells, located in the bottom-right quadrant 103c. The top-right quadrant 103b includes the basin exploration environment 102b with an equivalent total space for exploration as the basin exploration environment 102a but with many additional exploration wells. Additionally, the bottom-left quadrant 103d includes the basin exploration environment 102d with an equivalent total space for exploration as the basin exploration environment 102c but with fewer exploration wells.

The exploration wells in each of the basin exploration environments 102a-102d may be represented by discovery wells 104 and dry wells 106. The discovery wells 104 may demonstrate a number of the exploration wells that are producing hydrocarbon resources upon completion, and the dry wells 106 may demonstrate a number of the exploration wells that are not able to produce hydrocarbon resources. As the number of exploration wells within the basin exploration environments 102a-102d increases, the difficulty of discovering new discovery wells 104 also increases.

When comparing the exploration difficulty of the basin exploration environments 102a-102d, various characteristics of the basin exploration environments 102a-102d may be normalized. For example, the area, the number of exploration wells, and the number of discovery wells of the basin exploration environments 102a-102d may all be normalized based on a standard value of discovered resources in the basin exploration environments 102a-102d. Any other measurable characteristics of the basin exploration environments 102a-102d may also be used to normalize the other measurable characteristics of the basin exploration environments 102a-102d. Table 1 below provides an example of normalized characteristics of a basin A and a basin B.

TABLE 1

| Basin | Area | No. of Expl. Wells | No. of Disc. | Disc. Resources | Norm. Factor | Norm. Area | Norm. of Expl. Wells | Norm. No. of Disc. | Norm. Area of Basin per Field |
|---|---|---|---|---|---|---|---|---|---|
| A | 200 | 50 | 10 | 3000 | 0.333 | 66.667 | 16.6667 | 3.333 | 20 |
| B | 50 | 30 | 20 | 5000 | 0.2 | 0.2 | 6 | 4 | 2.5 |

The normalized values of table 1 are provided with respect to discovered resources at basin A and basin B. For example, table 1 is normalized to a normalization volume of 1000 (e.g., in millions of barrels of oil equivalent (MBOE)) for the discovered resources of basin A and basin B. A normalization factor is obtained based on the normalization volume and the volume of discovered resources (e.g., also in MBOE). The volume of discovered resources in basin A is multiplied by a normalization factor of 0.333 to reach the normalization volume of 1000 MBOE, and the volume of discovered resources in basin B is multiplied by a normalization factor of 0.2 to reach the normalization volume of 1000 MBOE. The other characteristics of basin A and basin B, such as the area, the number of exploration wells, and the number of discovery wells, may then be multiplied by their respective normalization factor (e.g., 0.333 for basin A or 0.2 for basin B) to generate normalized values for those characteristics.

To compare the basin exploration environments 102a-102d, the exploration environments 102a-102d are assigned to the quadrants 103a-103d according to an area of the basin per field plotted over a normalized number of exploration wells, as in the exploration efficiency comparison 100. In the normalized comparison, the basin exploration environments 102a-102d where exploration drilling has yielded smaller discoveries may require a greater number of exploration wells (e.g., X-axis 108) to deliver a volume of resources to which the values are normalized. Additionally, a smaller area of basin per discovery (e.g., Y-axis 110) suggests that exploration wells are more densely positioned within the basin. When the exploration wells are more densely positioned, there may be less space available for further exploration.

Figure 2:
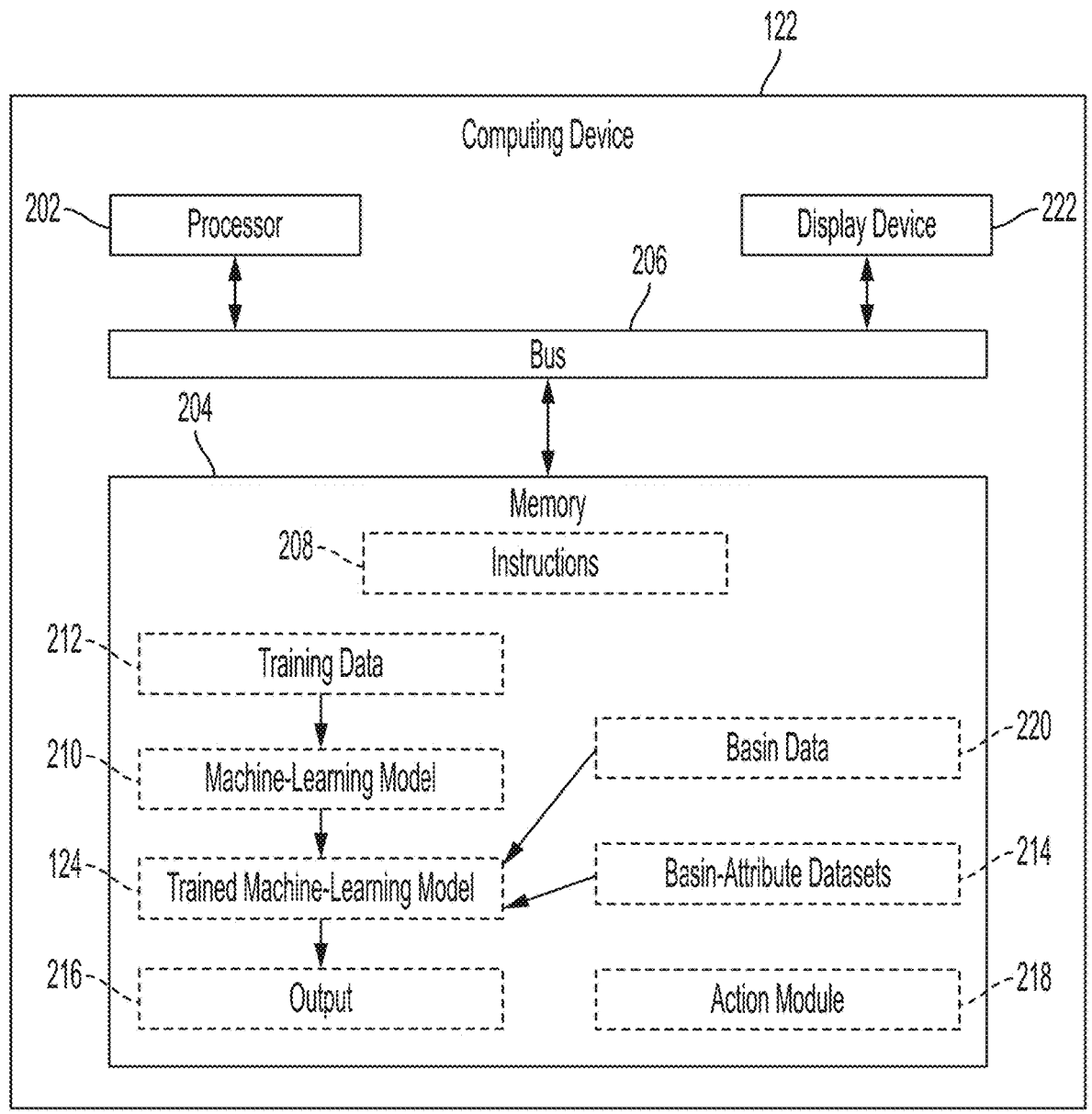
FIG. 2 depicts a block diagram of an example of a computing device according to some aspects of the present disclosure.

FIG. 2 is a block diagram of an example of a computing device 122 according to some aspects of the present disclosure. While FIG. 2 depicts the computing device 122 as including certain components, other examples may involve more, fewer, or different components than are shown in FIG. 2.

As shown, the computing device 122 includes a processor 202 communicatively coupled to a memory 204 by a bus 206. The processor 202 can include one processor or multiple processors. Non-limiting examples of the processor 202 include a Field-Programmable Gate Array (FPGA), an application-specific integrated circuit (ASIC), a microprocessor, or any combination of these. The processor 202 can execute instructions 208 stored in the memory 204 to perform operations. In some examples, the instructions 208 can include processor-specific instructions generated by a compiler or an interpreter from code written in any suitable computer-programming language, such as C, C++, C#, or Java.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory device includes a non-transitory computer-readable medium from which the processor 202 can read instructions 208. A non-transitory computer-readable medium can include electronic, optical, magnetic, or other storage devices capable of providing the processor 202 with the instructions 208 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 208.

The computing device 122 may include a trained machine-learning model 124 that can receive the basin data as input and provide an output indicating a predicted trajectory of exploration efficiency in a target basin. For example, the computing device 122 can execute the trained machine-learning model 124 based on the basin data of the target basin to generate an output indicating a predicted future efficiency of basin exploration within the target basin. The trained machine-learning model 124 may provide the predicted trajectory of exploration efficiency based on patterns and inference developed from training data 212. This can provide useful information to a basin operator as to whether the target basin is suitable for further exploration. For example, an efficiency trajectory indicating that further exploration of a target basin will likely be efficient in comparison to other basins may result in the basin operator choosing to further explore the target basin. Notifying the well operator of this information before further exploration operations can minimize the likelihood of inefficient exploration of mature basins and inadvertent omission of exploration in immature basins.

Additionally, the computing device 122 can include training data 212 for training a machine-learning model 210. The training data 212 can include multiple input-output pairs. Each input-output pair includes, as input, basin data (e.g., the area, the number of exploration wells, the number of discovery wells of the basin exploration environments, and any other basin data) and a basin dataset characterizing a subterranean formation area of a training basin. A subterranean formation area is a designated area of a subterranean formation, and characterizing the subterranean formation area may include contextual information about the underlying geological structure of the subterranean formation. Each input-output pair may also include, as output, one or more output exploration efficiency trajectories specifying exploration efficiency of the training basin. For example, an input-output pair can include an input geological characterization of a training basin and basin data and one or more output exploration efficiency trajectories for the training basin. The output exploration efficiency trajectories may have been manually generated using the input basin data and a historical exploration record of the training basin by a geologist or other expert. The training data 212 can include any number and combination of input-output pairs corresponding to any number and combination of training basins, though more input-output pairs may produce more robust training results.

In some examples, the machine-learning model 210 can include a neural network, a support vector machine, a Bayesian classifier, or any combination of these. The machine-learning model 210 may be in an untrained state. The machine-learning model 210 can be trained using the training data 212 to generate the trained machine-learning model 124.

Once trained, the machine-learning model 124 can be configured to receive basin data 220 corresponding to a target basin as input and responsively generate an output 216 indicating a predicted exploration efficiency for future exploration within the target basin. A target basin is a designated area of a subterranean formation to be explored, for example, to drill exploration wells in search of producible resources from unexplored areas of the target basin. The basin data 220 can be different than the training data 212, such that the basin data 220 was not used to train the machine-learning model 210. In this way, the basin data 220 can be "unknown" to the trained machine-learning model 124.

Figure 4A:
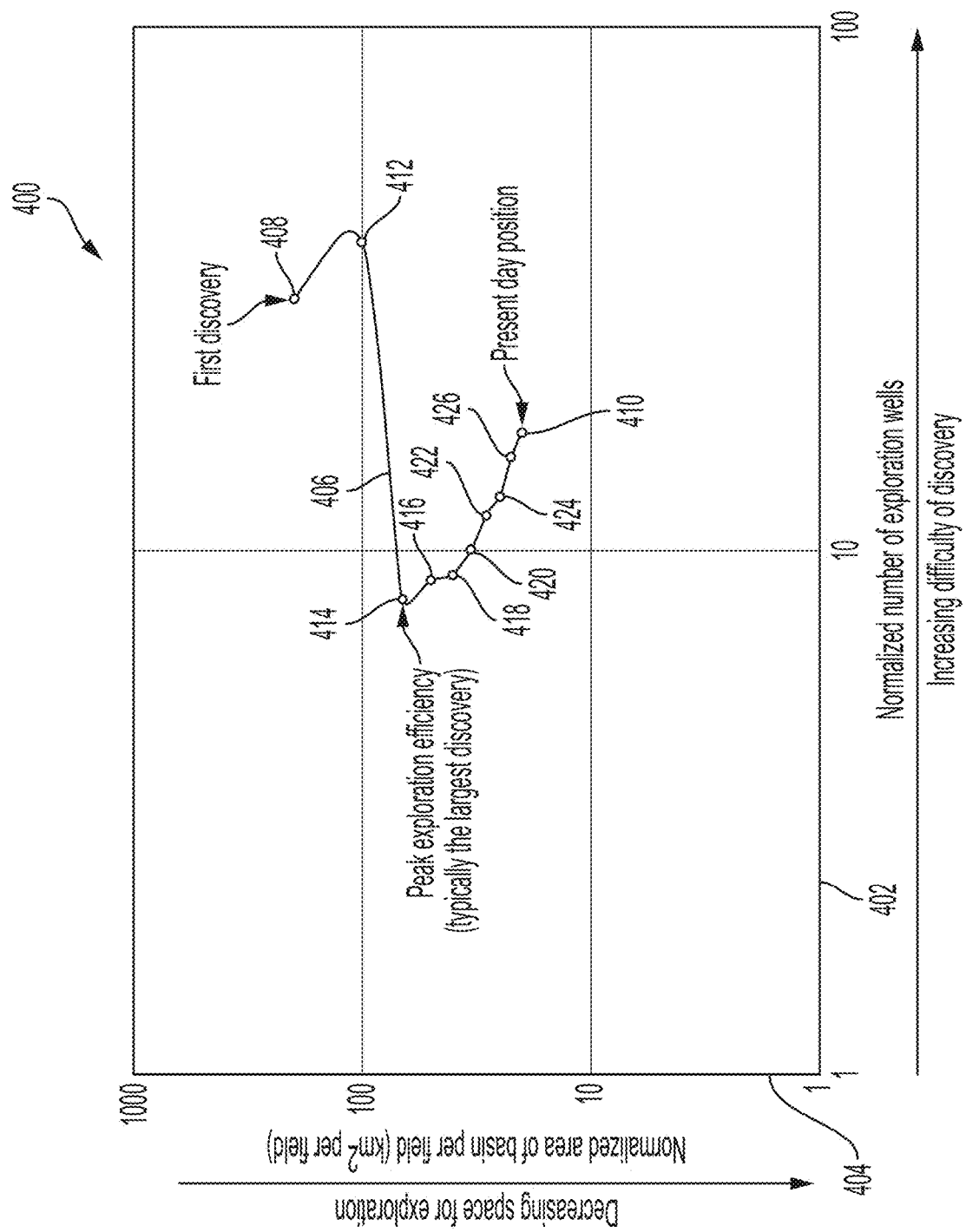

The basin data 220 may include multiple parameters that characterize the target basin. For example, the basin data 220 can include an area of the target basin, a number of exploration wells already drilled in the target basin, a number of discovery wells already found in the target basin, and a volume of discovered resources (e.g., producible hydrocarbons). These parameters may be normalized based on a normalization factor generated by normalizing the volume of discovered resources to a normalization volume. For example, when the volume of discovered resources is 3000 MBOE and the normalization volumes is 1000 MBOE, the normalization factor is 0.333. The additional parameters of the basin data 200 may be multiplied by the normalization factor to generate normalized values of the additional parameters. The normalized values of the parameters of the basin data 220 may be recalculated at each step of an exploration history of the basin. An example of the basin data 220 is depicted in FIG. 4A. In FIG. 4A, the X-axis represents a normalized number of exploration wells and the Y-axis represents a normalized area of the target basin per field (e.g., in $km^2$ per field). That is, as a value on the X-axis increases, the difficulty of new discovery increases. Additionally, as a value on the Y-axis decreases, the space for exploration in the target basin also decreases, which may lead to an increase in the difficulty of new discovery.

In some examples, the computing device 122 can also determine one or more basin-attribute datasets 214 based on the basin data 220. A basin-attribute dataset 214 is a dataset including indications of particular geological formations that make up a target basin. In another example, the basin-attribute dataset 214 may also include a tectonic history of the target basin, porosity or richness of organic carbons, other metrics pertaining to a quality of a petroleum system of the target basin, or any combination thereof. The computing device 122 can receive the basin-attribute datasets 214 prior to providing the basin data 220 as input to the trained machine-learning model 124, and then provide the basin-attribute datasets 214 as input to the trained machine-learning model 124 in addition to the basin data 220. The basin-attribute datasets 214 can assist the trained machine-learning model 124 in determining which types of geological bodies are present in the target basin. For example, the basin-attribute datasets 214 can serve as additional contextual information that can improve the accuracy of the output 216 from the trained machine-learning model 124 by ensuring that the trained machine-learning model 124 takes into account formation types when generating an output.

The computing device 122 can also include an action module 218. The action module 218 can include executable program code for taking one or more actions based on the output 216 of the trained machine-learning model 124. For example, the computing device 122 can execute the action module 218 to determine whether the target basin is more suitable for further exploration than other similarly analyzed basins based on the output 216 from the trained machine-learning model 124 and additional outputs 216 from the trained machine-learning model 124 associated with the other basins. A gradient of a slope of the output 216 and the slope's direction (e.g., increasing or decreasing X values) may be used in comparing the target basin and other similarly analyzed basins. The computing device 122 can then generate a graphical user interface (GUI) indicating whether the target basin is suitable for further exploration and display the GUI on a display device 222, such as a liquid crystal display or light-emitting diode display.

In some examples, the action module 218 can determine that a particular basin is likely to be more favorable for exploration than another basin based on an assigned exploration efficiency score determined from the outputs from the trained machine-learning model 124. For example, the action module 218 can apply a scoring-analysis algorithm to the input basin data to identify basins with a greatest predicted exploration efficiency. After scoring the basins, the computing device 122 can generate a graphical user interface (GUI) that identifies scored basins relative to one another, such as in a map depiction of a geographical area.

As one particular example, the computing device 122 uses the trained machine-learning model 124 to generate an output 216 indicating an exploration efficiency trajectory of the target basin associated with the basin data 220. The computing device 122 can then execute the action module 218 to apply a set of rules based on the output 216 to determine whether the target basin is suitable for further exploration. The rules may indicate that the target basin is predicted to have a greater exploration efficiency or a lesser exploration efficiency than other analyzed basins. The computing device 122 can generate and display a GUI that includes an alert indicating whether the target basin is suitable for further exploration based on the comparison.

Figure 3:
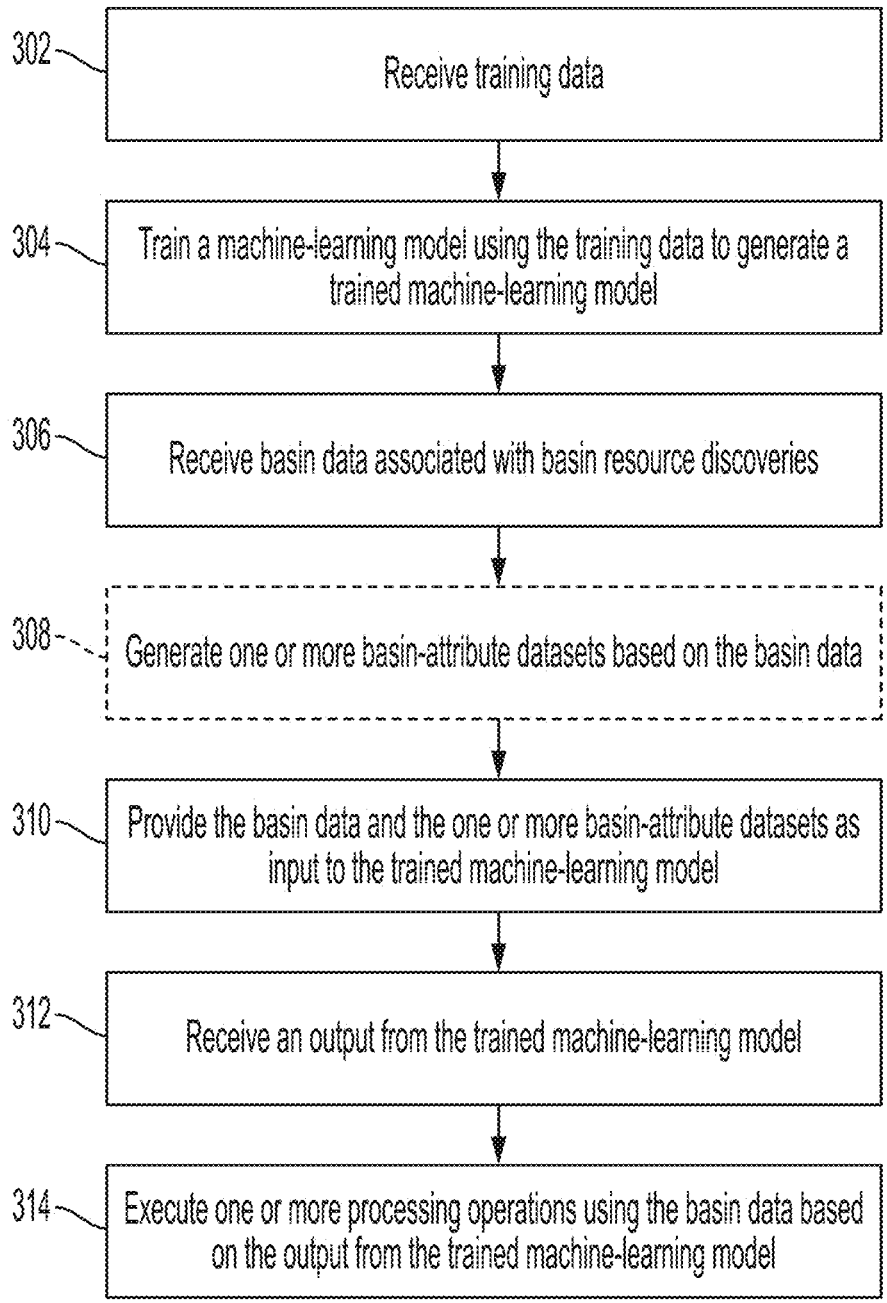
FIG. 3 depicts a flow chart of an example of a process according to some aspects of the present disclosure.

In some examples, the computing device 122 can implement the process shown in FIG. 3 for effectuating some aspects of the present disclosure. Other examples can involve more operations, fewer operations, different operations, or a different order of the operations shown in FIG. 3. The operations of FIG. 3 are described below with reference to the components shown in FIG. 2.

In block 302, the processor 202 receives the training data 212. The training data 212 can include a plurality of mature basin datasets and their corresponding exploration efficiency trajectories. In some examples, the training data 212 can also include training basin-attribute datasets that indicate a geological formation type of the basins corresponding to the training data 212.

In block 304, the processor 202 trains a machine-learning model 210 using the training data 212 to generate a trained machine-learning model 124. The processor 202 can train the machine-learning model 210 using a supervised training approach, through which the machine-learning model 210 can learn patterns within the training data 212 (e.g., patterns between the input basin datasets and the output exploration efficiency trajectories). The processor 202 can train the machine-learning model 210 by iteratively tuning weights internal to the machine-learning model 210 based on the training data 212.

After the machine-learning model 124 is trained, the process can continue to block 306. At block 306, the processor 202 receives basin data 220 associated with a target basin. The basin data 220 can include data generated from an exploration history of the target basin. For example, the exploration history may include an area of the basin, a number of exploration wells, a number of discovery wells, and a volume of discovered resources. These values may be provided, for example, each time a discovery well is located within the target basin. For example, a target basin with twenty discovery wells may have basin data 220 with information corresponding to twenty time periods where each time period is associated with when a discovery well was discovered.

In block 308, the processor 202 optionally generates one or more basin-attribute datasets 214 based on the basin data 220, where the one or more basin-attribute datasets 214 correspond to one or more types of geological attributes of the target basin. The processor 202 can apply one or more algorithms to the basin data 220 to generate the basin-attribute datasets 214.

In block 310, the processor 202 provides the basin data 220, the one or more basin-attribute datasets 214, or both of these as input to the trained machine-learning model 124.

Figure 5:
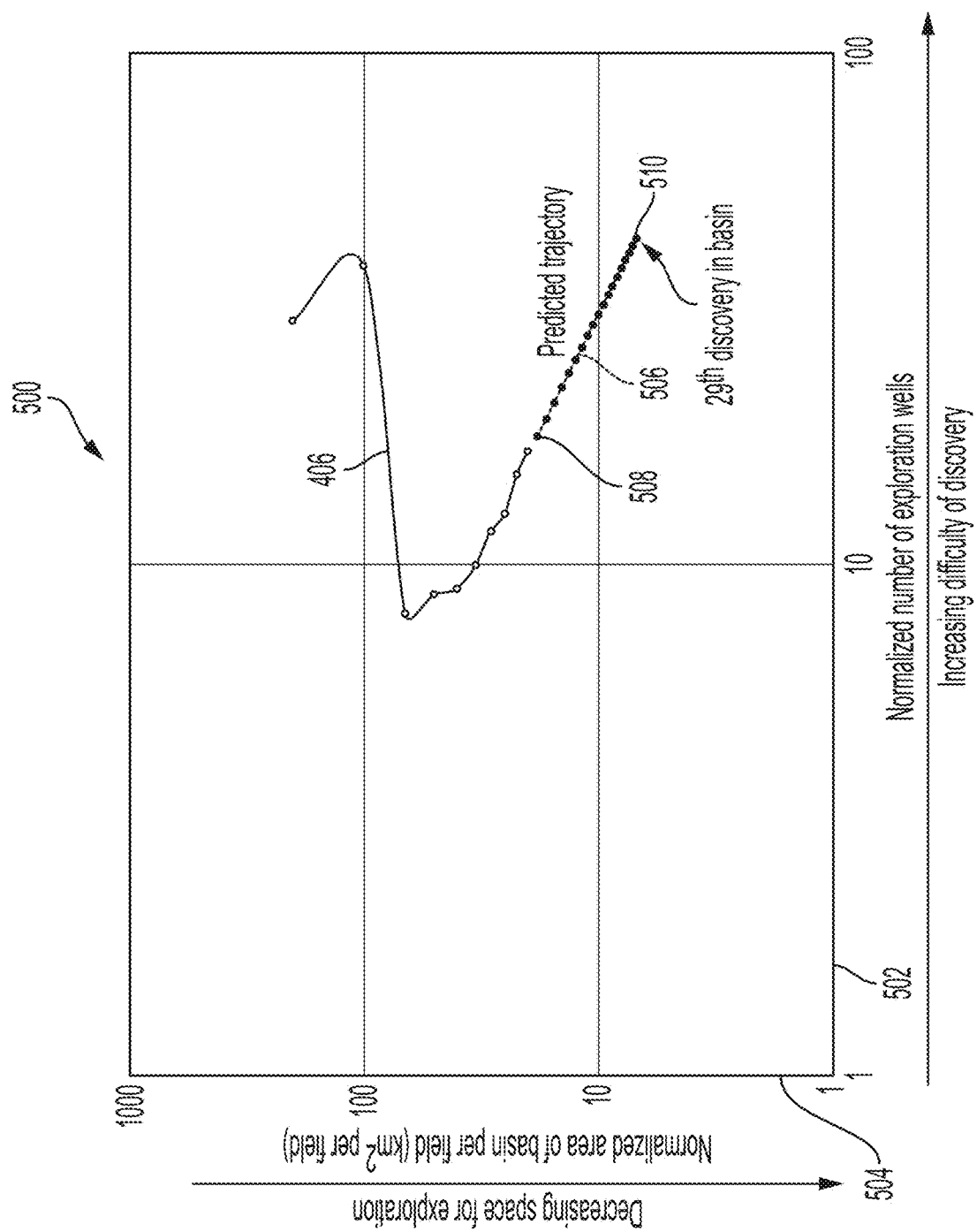
FIG. 5 depicts an example of a graph representing an output from a trained machine-learning model according to some aspects of the present disclosure.

In block 312, the processor 202 receives an output 216 from the trained machine-learning model 124. The output 216 can indicate a predicted trajectory of exploration efficiency of the target basin. For example, the output 216 can be a graph that represents exploration difficulty in future explorations of the target basin, as depicted in FIG. 5. Additionally or alternatively, the output 216 can be one or more identifiers, where the identifiers indicate a numerical representation of the exploration efficiency. For example, the predicted trajectory of exploration efficiency of the target basin may be represented on a scale based on a slope of the predicted trajectory of exploration, as discussed below in greater detail with respect to FIG. 5. Additionally, a position of the predicted trajectory of exploration efficiency on an X-axis of the graph 500 in FIG. 5 may also provide an indication of exploration efficiency. For example, a low X-axis value may suggest a large amount of easily accessible hydrocarbons may remain in the target basin.

In block 314, the processor 202 executes one or more processing operations using the basin data 220 based on the output 216 from the trained machine-learning model 124. In some examples, the processor 202 can execute the action module 218 to implement the one or more processing operations. For example, the action module 218 may include program code that is executable by the processor 202 to cause the processor 202 to implement the one or more processing operations.

In some examples, the one or more processing operations can facilitate further hydrocarbon exploration of the target basin by determining whether the target basin is more suitable for further exploration than other basins based on the output 216 from the trained machine-learning model 124 and additional outputs 216 from the trained machine-learning model 124 associated with the other basins. The computing device 122 can then generate a graphical user interface (GUI) indicating whether the target basin is suitable for further exploration and display the GUI on a display device 222, such as a liquid crystal display or light-emitting diode display. In another example, the processing operations may include generating a GUI that outputs the predicted efficiency trajectory of the target basin and displaying the GUI on the display device 222.

While the process of FIG. 3 is described with respect to a target basin, a similar process may be performed on an individual play within a basin or at an individual offshore region. That is, exploration efficiency may be determined in smaller regions that make up less than a whole of a target basin. By determining exploration efficiency for smaller regions of the target basin, a company may be able to make an informed decision about acquiring exploration rights to the smaller region of the target basin.

FIG. 4A is an example of a graph 400 representing basin data from table 401 of FIG. 4B according to some aspects of the present disclosure. An X-axis 402 of the graph 400 represents a normalized number of exploration wells on a logarithmic scale. A Y-axis 404 of the graph 400 represents a normalized area of a basin per field where each field is one square kilometer. The Y-axis 404 is also represented on a logarithmic scale. A line 406 represents basin data 220 of a target basin using exploration information of the target basin to date from the table 401. In an example, the line 406 may be normalized based on the resources discovered. In such an example, a standard value of resources, such as 1000 MBOE, may be used to determine a normalizing factor for each discovery well found in the target basin.

Each row of the table 401 may represent a new discovery well discovered during exploration of the target basin. For example, the table 401 represents the basin data from an initial discovery well 408 to a $10^{th}$ discovery well 410 found in a target basin. Each of the plotted discovery wells 408-426 are plotted using the normalized area of the basin per field and the normalized number of exploration wells. The resulting line 406, which is fit to the plotted discovery wells 408-426, represents the exploration efficiency of the target basin at each of the exploration steps associated with each of the recorded discovery wells 408-426. In an example, as the normalized area of the basin per field decreases, and the normalized number of exploration wells increases, the exploration efficiency of the target basin decreases. That is, both a decreasing space for exploration in the target basin, as provided on the Y-axis 404, and an increasing difficulty of discovery, as provided on the X-axis 402, lead to a diminished exploration efficiency for the target basin.

FIG. 5 depicts an example of a graph 500 representing an output from the trained machine-learning model 124 according to some aspects of the present disclosure. The graph 500 includes an X-axis 502 representing a normalized number of exploration wells on a logarithmic scale. A Y-axis 504 of the graph 500 represents a normalized area of a basin per field where each field is one square kilometer. The Y-axis 504 is also represented on a logarithmic scale. A predicted efficiency trajectory 506 may be generated as the output of the trained machine-learning model 124 based on the basin data 220 from Table 2 represented by the line 406. For example, the predicted efficiency trajectory 506 may represent predicted normalized basin data for an 11$^{th}$ discovery well 508 through a 29$^{th}$ discovery well 510. The predicted efficiency trajectory 506 may provide a prediction of how efficient future exploration of the target basin will be. In an example, the graph 500 may be generated as a GUI for display on the display device 222 of the computing device 122.

Figure 6:
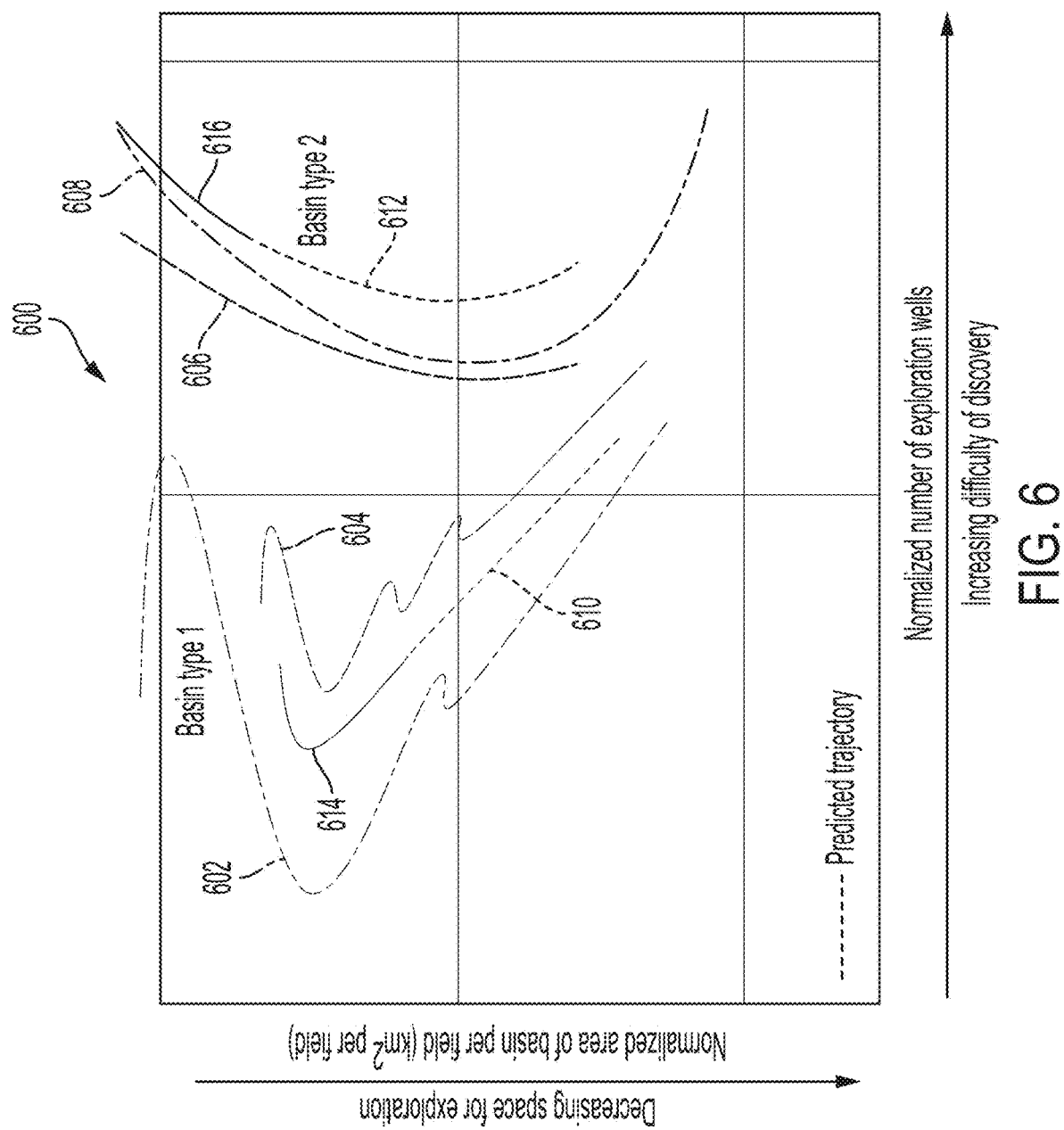
FIG. 6 depicts an example of a graph representing training data and outputs from a trained machine-learning model according to some aspects of the present disclosure.

FIG. 6 depicts an example of a graph 600 representing training data 602, 604, 606, and 608 and outputs 610 and 612 from a trained machine-learning model 124 according to some aspects of the present disclosure. In an example, basin data 614 and 616, along with basin-attribute datasets, such as an indication of a basin type 1 associated with the basin data 614 and an indication of basin type 2 associated with the basin data 616, may be provided to the trained machine-learning model 124. The trained machine-learning model 124 may output the outputs 610 and 612. The outputs 610 and 612 may include enhanced accuracy when compared to outputs generated without the basin-attribute datasets due to the trained machine-learning model 124 generating the outputs 610 and 612 using context from the basin-attribute datasets of the basin data 614 and 616. That is, the trained machine-learning model 124 may generate the output 610 to align more closely with the training data 602 and 604 from the same basin type as the basin data 614. Similarly, the trained machine-learning model 124 may generate the output 612 to align more closely with the training data 606 and 608 from the same basin type as the basin data 616.

In an example, the trained machine-learning model 124 may determine the predicted efficiency trajectory 610 or 612 by comparing similarities in shape and form of the training data 602, 604, 606, and 608 to the basin data 614 or 616 to extrapolate a shape of the predicted efficiency trajectory 610 or 612 at future discovery wells. Additionally, the trained machine-learning model 124 may classify segments of the basin data 614 or 616 by shape and form to identify the basin type of the target basins associated with the basin data 614 and 616. That is, the trained machine-learning model 124 may automatically identify the basin type associated with the basin data 614 and 616 rather than receive the basin type information from another source (e.g., as the basin-attribute dataset). In this manner, the basin data 614 and 616 may be classified based on qualities of the underlying petroleum systems of the target basins.

Assessment of the properties of the basin data 614 and 616 may be performed over a range of a geographic entity (e.g., the target basin). The range of the geographic entity may include a geological basin, a portion of a basin that is within a particular country, a portion of a basin that is within a particular state, or individual exploration blocks of a geological entity. Different exploration trajectories of the range of the geographic entity may be classified based on the geological properties that occur in the subsurface. A global dataset that encompasses multiple exploration trajectories may facilitate more accurate predictions by enabling geology of a basin to inform the prediction of the basin's resource potential. Thus, the trained machine-learning model 124 may enable the ability to learn from geological observations to improve a predictive capability.

Hydrocarbon exploration can be facilitated according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a memory including instructions that are executable by the processor to cause the processor to: receive basin data of a target basin comprising an area of the target basin, a number of exploration wells in the target basin, and a number of discovery wells in the target basin; provide the basin data as input to a trained machine-learning model to determine a predicted trajectory of exploration efficiency of the target basin; and in response to providing the basin data as input to the trained machine-learning model, receive an output from the trained machine-learning model indicating the predicted trajectory of exploration efficiency in the target basin.

Example 2 is the system of example 1, wherein the instructions are further executable by the processor to cause the processor to: execute one or more processing operations to direct hydrocarbon exploration based on the basin data and the output from the trained machine-learning model.

Example 3 is the system of example 2, wherein the instructions are further executable by the processor to cause the processor to: receive a basin-attribute dataset of the target basin; providing the basin-attribute dataset as input to the trained machine-learning model; and in response to providing the basin-attribute dataset as input to the trained machine-learning model, receive an output from the trained machine-learning model indicating the predicted trajectory of exploration efficiency in the target basin based on the basin data and the basin-attribute dataset.

Example 4 is the system of example 3, wherein the basin-attribute dataset comprises an indication of a geological formation type of the target basin.

Example 5 is the system of examples 1-4, wherein the instructions are further executable by the processor to cause the processor to: generate a graphical user interface that charts the basin data and the predicted trajectory of exploration efficiency; and display the graphical user interface on a display device.

Example 6 is the system of examples 1-5, wherein the memory further includes instructions that are executable by the processor to cause the processor to, prior to receiving the basin data: receive training data that includes a plurality of mature basin datasets and a plurality of exploration efficiency trajectories corresponding to the plurality of mature basin datasets; and train a machine-learning model using the training data to generate the trained machine-learning model.

Example 7 is the system of example 6, wherein the training data further includes training basin-attribute datasets comprising indications of geological formation types corresponding to the training data.

Example 8 is the system of examples 1-7, wherein the instructions are further executable by the processor to cause the processor to: receive a second basin data of a second target basin comprising an area of the second target basin, a number of exploration wells in the second target basin, and a number of discovery wells in the second target basin; provide the second basin data as input to a trained machine-learning model to determine a second predicted trajectory of exploration efficiency of the second target basin; in response to providing the second basin data as input to the trained machine-learning model, receive a second output from the trained machine-learning model indicating the second predicted trajectory of exploration efficiency in the target basin; and execute one or more processing operations to compare the predicted trajectory of exploration efficiency of the target basin and the second predicted trajectory of exploration efficiency of the second target basin.

Example 9 is the system of examples 1-8, wherein the instructions are further executable by the processor to cause the processor to: normalize the basin data using a standard value of discovered resources prior to providing the basin data to the trained machine-learning model.

Example 10 is a method comprising: receiving, by a processor, basin data of a target basin comprising an area of the target basin, a number of exploration wells in the target basin, and a number of discovery wells in the target basin; providing, by the processor, the basin data as input to a trained machine-learning model to generate a predicted trajectory of exploration efficiency of the target basin; in response to providing the basin data as input to the trained machine-learning model, receiving, by the processor, an output from the trained machine-learning model indicating the predicted trajectory of exploration efficiency in the target basin; and executing, by the processor, one or more processing operations to direct hydrocarbon exploration based on the basin data and the output from the trained machine-learning model.

Example 11 is the method of example 10, further comprising: receiving, by the processor, a basin-attribute dataset of the target basin; providing, by the processor, the basin-attribute dataset as input to the trained machine-learning model; and in response to providing the basin-attribute dataset as input to the trained machine-learning model, receiving, by the processor, an output from the trained machine-learning model indicating the predicted trajectory of exploration efficiency in the target basin based on the basin data and the basin-attribute dataset.

Example 12 is the method of example 11, wherein the basin-attribute dataset comprises an indication of a geological formation type of the target basin.

Example 13 is the method of examples 10-12, further comprising: generating, by the processor, a graphical user interface that charts the basin data and the predicted trajectory of exploration efficiency; and displaying, by the processor, the graphical user interface on a display device.

Example 14 is the method of examples 10-13, further comprising, prior to receiving the basin data: receiving, by the processor, training data that includes a plurality of mature basin datasets and a plurality of exploration efficiency trajectories corresponding to the plurality of mature basin datasets; and training, by the processor, a machine-learning model using the training data to generate the trained machine-learning model.

Example 15 is the method of examples 10-14, further comprising: normalizing, by the processor, the basin data using a standard value of discovered resources prior to providing the basin data to the trained machine-learning model.

Example 16 is a non-transitory computer-readable medium comprising program code that is executable by a processor to cause the processor to: receive basin data from a target basin comprising an area of the target basin, a number of exploration wells in the target basin, and a number of discovery wells in the target basin; provide the basin data as input to a trained machine-learning model to generate a predicted trajectory of exploration efficiency of the target basin; in response to providing the basin data as input to the trained machine-learning model, receive an output from the trained machine-learning model indicating the predicted trajectory of exploration efficiency in the target basin; and execute one or more processing operations to direct hydrocarbon exploration based on the basin data and the output from the trained machine-learning model.

Example 17 is the non-transitory computer-readable medium of example 16, wherein the program code is further executable by the processor to cause the processor to: receive training data that includes a plurality of mature basin datasets and a plurality of exploration efficiency trajectories corresponding to the plurality of mature basin datasets; and train a machine-learning model using the training data to generate the trained machine-learning model.

Example 18 is the non-transitory computer-readable medium of example 17, wherein the training data further includes training basin-attribute datasets comprising indications of geological formation types corresponding to the training data.

Example 19 is the non-transitory computer-readable medium of examples 16-18, wherein the program code is further executable by the processor to cause the processor to: normalize the basin data using a standard value of discovered resources prior to providing the basin data to the trained machine-learning model.

Example 20 is the non-transitory computer-readable medium of examples 16-19, wherein the program code is further executable by the processor to cause the processor to: receive a basin-attribute dataset of the target basin; providing the basin-attribute dataset as input to the trained machine-learning model; and in response to providing the basin-attribute dataset as input to the trained machine-learning model, receive an output from the trained machine-learning model indicating the predicted trajectory of exploration efficiency in the target basin based on the basin data and the basin-attribute dataset.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
a processor; and
a memory including instructions that are executable by the processor to cause the processor to:
receive basin data of a target basin comprising an area of the target basin, a number of exploration wells in the target basin, and a number of discovery wells in the target basin;
provide the basin data as input to a trained machine-learning model to determine a predicted trajectory of exploration efficiency of the target basin; and
in response to providing the basin data as input to the trained machine-learning model, receive an output from the trained machine-learning model indicating the predicted trajectory of exploration efficiency, wherein the predicted trajectory of exploration efficiency comprises a prediction of future exploration efficiency in the target basin.

2. The system of claim 1, wherein the instructions are further executable by the processor to cause the processor to:
execute one or more processing operations to direct hydrocarbon exploration based on the basin data and the output from the trained machine-learning model.

3. The system of claim 1, wherein the instructions are further executable by the processor to cause the processor to:
receive a basin-attribute dataset of the target basin;
providing the basin-attribute dataset as input to the trained machine-learning model; and
in response to providing the basin-attribute dataset as input to the trained machine-learning model, receive an output from the trained machine-learning model indicating the predicted trajectory of exploration efficiency in the target basin based on the basin data and the basin-attribute dataset.

4. The system of claim 3, wherein the basin-attribute dataset comprises an indication of a geological formation type of the target basin.

5. The system of claim 1, wherein the instructions are further executable by the processor to cause the processor to:
generate a graphical user interface that charts the basin data and the predicted trajectory of exploration efficiency; and
display the graphical user interface on a display device.

6. The system of claim 1, wherein the memory further includes instructions that are executable by the processor to cause the processor to, prior to receiving the basin data:
receive training data that includes a plurality of mature basin datasets and a plurality of exploration efficiency trajectories corresponding to the plurality of mature basin datasets; and
train a machine-learning model using the training data to generate the trained machine-learning model.

7. The system of claim 6, wherein the training data further includes training basin-attribute datasets comprising indications of geological formation types corresponding to the training data.

8. The system of claim 1, wherein the instructions are further executable by the processor to cause the processor to:
receive a second basin data of a second target basin comprising an area of the second target basin, a number of exploration wells in the second target basin, and a number of discovery wells in the second target basin;
provide the second basin data as input to a trained machine-learning model to determine a second predicted trajectory of exploration efficiency of the second target basin;
in response to providing the second basin data as input to the trained machine-learning model, receive a second output from the trained machine-learning model indicating the second predicted trajectory of exploration efficiency in the target basin; and
execute one or more processing operations to compare the predicted trajectory of exploration efficiency of the target basin and the second predicted trajectory of exploration efficiency of the second target basin.

9. The system of claim 1, wherein the instructions are further executable by the processor to cause the processor to:
normalize the basin data using a standard value of discovered resources prior to providing the basin data to the trained machine-learning model.

10. A method comprising:
receiving, by a processor, basin data of a target basin comprising an area of the target basin, a number of exploration wells in the target basin, and a number of discovery wells in the target basin;
providing, by the processor, the basin data as input to a trained machine-learning model to generate a predicted trajectory of exploration efficiency of the target basin;
in response to providing the basin data as input to the trained machine-learning model, receiving, by the processor, an output from the trained machine-learning model indicating the predicted trajectory of exploration efficiency, wherein the predicted trajectory of exploration efficiency comprises a prediction of future exploration efficiency in the target basin; and
executing, by the processor, one or more processing operations to direct hydrocarbon exploration based on the basin data and the output from the trained machine-learning model.

11. The method of claim 10, further comprising:
receiving, by the processor, a basin-attribute dataset of the target basin;
providing, by the processor, the basin-attribute dataset as input to the trained machine-learning model; and
in response to providing the basin-attribute dataset as input to the trained machine-learning model, receiving, by the processor, an output from the trained machine-learning model indicating the predicted trajectory of exploration efficiency in the target basin based on the basin data and the basin-attribute dataset.

12. The method of claim 11, wherein the basin-attribute dataset comprises an indication of a geological formation type of the target basin.

13. The method of claim 10, further comprising:
generating, by the processor, a graphical user interface that charts the basin data and the predicted trajectory of exploration efficiency; and
displaying, by the processor, the graphical user interface on a display device.

14. The method of claim 10, further comprising, prior to receiving the basin data:
receiving, by the processor, training data that includes a plurality of mature basin datasets and a plurality of exploration efficiency trajectories corresponding to the plurality of mature basin datasets; and
training, by the processor, a machine-learning model using the training data to generate the trained machine-learning model.

15. The method of claim 10, further comprising:
normalizing, by the processor, the basin data using a standard value of discovered resources prior to providing the basin data to the trained machine-learning model.

16. A non-transitory computer-readable medium comprising program code that is executable by a processor to cause the processor to:
receive basin data from a target basin comprising an area of the target basin, a number of exploration wells in the target basin, and a number of discovery wells in the target basin;
provide the basin data as input to a trained machine-learning model to generate a predicted trajectory of exploration efficiency of the target basin;
in response to providing the basin data as input to the trained machine-learning model, receive an output from the trained machine-learning model indicating the predicted trajectory of exploration efficiency, wherein the predicted trajectory of exploration efficiency comprises a prediction of future exploration efficiency in the target basin; and
execute one or more processing operations to direct hydrocarbon exploration based on the basin data and the output from the trained machine-learning model.

17. The non-transitory computer-readable medium of claim 16, wherein the program code is further executable by the processor to cause the processor to:
receive training data that includes a plurality of mature basin datasets and a plurality of exploration efficiency trajectories corresponding to the plurality of mature basin datasets; and
train a machine-learning model using the training data to generate the trained machine-learning model.

18. The non-transitory computer-readable medium of claim 17, wherein the training data further includes training basin-attribute datasets comprising indications of geological formation types corresponding to the training data.

19. The non-transitory computer-readable medium of claim 16, wherein the program code is further executable by the processor to cause the processor to:
normalize the basin data using a standard value of discovered resources prior to providing the basin data to the trained machine-learning model.

20. The non-transitory computer-readable medium of claim 16, wherein the program code is further executable by the processor to cause the processor to:
receive a basin-attribute dataset of the target basin;
providing the basin-attribute dataset as input to the trained machine-learning model; and
in response to providing the basin-attribute dataset as input to the trained machine-learning model, receive an output from the trained machine-learning model indicating the predicted trajectory of exploration efficiency in the target basin based on the basin data and the basin-attribute dataset.

* * * * *